Feb. 15, 1944.  E. C. JARRETT  2,341,992
BELT ADJUSTER
Filed April 17, 1942
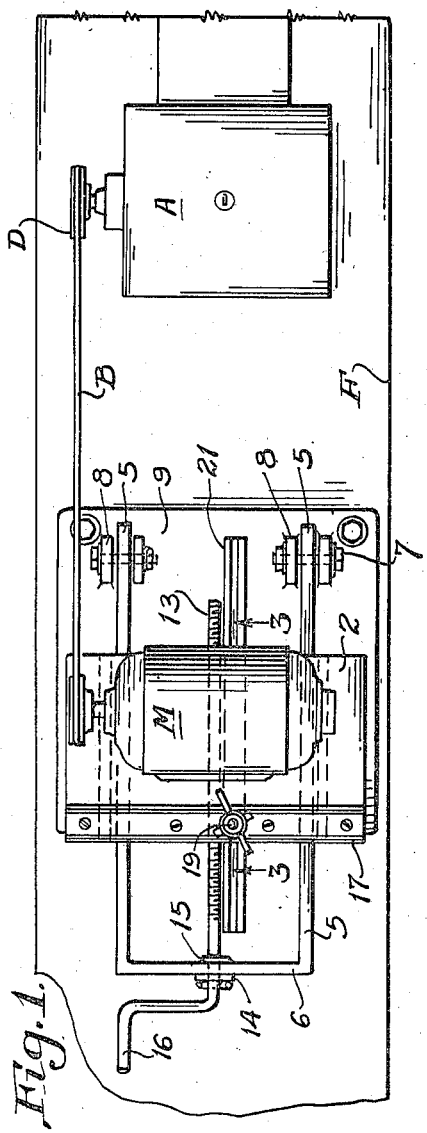
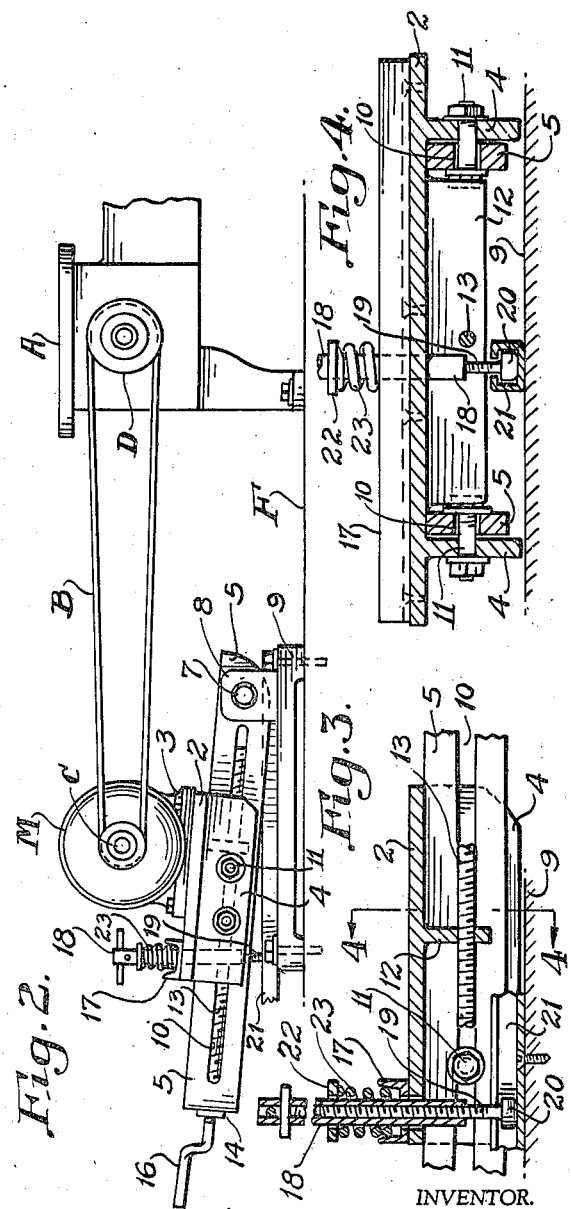
INVENTOR.
Eddie C. Jarrett
BY W. E. Williams
ATTORNEY.

Patented Feb. 15, 1944

2,341,992

UNITED STATES PATENT OFFICE 2,341,992

BELT ADJUSTER

Eddie Craig Jarrett, West Los Angeles, Calif.

Application April 17, 1942, Serial No. 439,371

3 Claims. (Cl. 74—242.15)

My invention relates to mechanisms which I term belt adjusters when power is transmitted through the medium of pulleys and belts.

My invention is especially desirable for use with flexible belts such as leather and fabric forms of belts. It may be used with chain belting also if desired.

The invention is especially desirable for use wherein the loads transmitted by the belts often and more or less rapidly vary widely in the amount of power carried by the belt.

An object of the invention is to provide an adjustment of the belt whereby there will be accomplished a more uniform and elastic, as it were, transmission from the driving unit to the receiving unit of the power transmission, to become as it were, a sort of shock absorber avoiding sudden variations when the power factors of load suddenly vary in quantity in either direction, thus there will become, as it were, a more gentle merging of the load as the power factors change.

An object of the invention is to provide means whereby there can be maintained with the least amount of labor and time an adjustment of the tension on the pulleys and the belts to any range within the limits of the load desired to be carried by the belt.

Reference will be had to the accompanying drawing in which

Fig. 1 is a top plan of my mechanism.

Fig. 2 is a side elevation of what is shown in Fig. 1.

Fig. 3 is a vertical section on line 3—3 of Fig. 1. In this figure the motor driving unit is omitted.

Fig. 4 is a transverse section on line 4—4 of Fig. 3.

In the drawing F indicates a floor space or any space upon which my adjuster may be mounted. M indicates a motor or a driving unit or any unit whereby power is transmitted from or to by a belt B. A indicates a receiving or driving power unit of any suitable character to drive or to receive power from the belt B. C indicates the pulley on the shaft of the motor M, and D the pulley on the unit A. Thus the belt B becomes the power transmission means between the motor M and the unit A.

The unit A may be supported in any manner in a fixed position as desired whereby the pulley D may be suitably mounted on any suitable shaft as desired, whereby the pulley D may be considered as being located in a fixed position permitting revolution.

The motor M, or any equivalent of a power unit, is fixed by any suitable means to a block or bed 2 and this is shown as a motor fixed by the bolts 3 to the block 2.

This bed or block 2 is provided with downwardly extending flanges 4 and is slidably mounted on a U-shaped frame composed of the beams 5 connected together by the cross portion 6. The frame beams 5 are hinged on pins 7 to brackets 8 fixed on to a base block 9 shown as bolted to the floor F.

The beams 5 are slotted in the middle portion by slots 10 through which there extends sliding bolts 11 which bolts are fixed into the flanges 4 of the block or bed 2, which thus retain the bed or block 2 to slide on the beams 5.

The bed or block 2 is provided with a transverse underside flange 12. Into this flange 12 there is screwed an adjusting screw rod 13. This rod 13 is held in place and adapted to revolve in an aperture in the frame portion 6, and has mounted on the rod 13 fixed flanges 14 and 15 which prevent the rod 13 from sliding endwise through the frame portion 6. On the outside end of the rod 13 there is a crank 16 whereby on the revolution of this crank 16 the block or bed 2 is moved along the frame beams 5 and in which movement there occurs a shortening or lengthening of the distances between the pulleys C and D, thus tightening or loosening the belt B on the pulleys on which it is mounted.

On the block or bed 2 there is mounted a transverse channel beam 17 and through this beam 17 and the top surface of the block or bed 2 there extends a vertical sleeve 18 threaded on its interior and adapted to be screwed upon a vertically threaded bolt 19 having a rectangular head 20 which is mounted to slide within a channel 21 fixed to the base block 9. Thus as the screw threaded rod 13 slides the block or bed 2 along the beams 5 the head 20 of the screw 19 slides along the channel 21. The vertical sleeve 18 has fixed thereon a flange 22 and between this flange 22 and the channel beam 17 there is mounted a coil spring 23. Thus the distance between the base 9 and the block or bed 2 is held in elastic relationship around the hinge pins 7 which connect the frame beams 5 to the base 9.

The normal position of the parts in the form of acting as belt adjusters is that of Fig. 2 wherein the frame beams 5 are at an angle to the base 9 and are held in that angle or in any other angles as desired by the tension of the belt B. Thus the weights of the motor M and the block or bed 2 and the frame members 5 and 6 and the screw 13 act as levers on a lever length from the pins 7 to the center of gravity of the mass parts from the left of the pins 7 to exert a tension on the belt B.

Any extra tension on the belt B which might be greater than the normal mass center of gravity weight asunder from the pins 7 would be resisted by the spring 23 on the sleeve 18.

Thus the distance between the pulleys C and D may be lengthened or shortened by simply turning the crank 16 of the screw 13.

The leverage by gravity weight of the parts around the pins 7 by the angle of the beams 5 to the base 9 may be eliminated as desired by an adjustment of the parts whereby the beams 5 and the block or bed 2 may be placed in parallel relation with the base 9, as is indicated in Figs. 3 and 4.

Thus by my mechanisms the tension on the belt B may be adjusted as to any desired distance between the pulleys C and D by the positive means of letting down the angle of the beams 5 to a parallel relation to the base 9. In this position there may still remain the spring tension of the spring 23 when and as the tension on the belt is made sufficiently strong to compress the spring 23. But this situation may be avoided as and when desired by screwing the sleeve 18 down to complete collapse of the spring 23.

Thus my belt adjuster may be used to take up any extra stretch of the belt as to its length or it can be shortened as desired and the movement of the block or bed 2 moved to the right or the left to accommodate whatever may happen as to belt tension or belt length within the limits of the dimensions built into the parts.

The adjustments which are performed by my mechanism may be made at any time as desired whether the machine is running or is idle.

What I claim is:

1. In a belt adjuster of the class described, a fixed unit of power transmission provided with a pulley over which a belt is trained to a pulley on an adjustable power unit, a base block fixed to any suitable location for supporting an adjustable power unit, hinge pin brackets mounted on said base block, a U shaped frame having beam ends, said beam ends hinged to said brackets on said base block, said beam ends of said U shaped frame connected to each other by a transverse portion, longitudinal slots in said beam ends of said frame, a bed block mounted on said beam ends and held in sliding contact thereon by flanges on said bed block which extend down the sides of said beam ends, bolts fixed in the said flanges and passing through the said slots in the said beam ends, a power unit mounted on said bed block, a belt pulley on said power unit on said bed block, a transverse flange on the under side of said bed block, a screw threaded rod passing through the transverse portion of said U shaped frame, said rod screwed into the transverse flange of said bed block, a crank end of said rod extending out from said U shaped frame, flanges fixed on said rod on each side of said transverse portion of said U shaped frame whereby on the turning of the said crank the said bed block will be moved along the said beams of said frame, adjustable means for rocking said U shaped frame to vary its angularity with the said base block.

2. In a belt adjuster of the class described, a fixed unit of power transmission provided with a pulley over which a belt is trained to a pulley on an adjustable power unit, a base block fixed to any suitable location for supporting an adjustable power unit, hinge pin brackets mounted on said base block, a U shaped frame having beam ends, said beam ends hinged to said brackets on said base block, said beam ends of said U shaped frame connected to each other by a transverse portion, longitudinal slots in said beam ends of said frame, a bed block mounted on said beam ends and held in sliding contact thereon by flanges on said bed block which extend down the sides of said beam ends, bolts fixed in the said flanges and passing through the said slots in the said beam ends, a power unit mounted on said bed block, a belt pulley on said power unit on said bed block, a transverse flange on the under side of said bed block, a screw threaded rod passing through the transverse portion of said U shaped frame, said rod screwed into the transverse flange of said bed block, a crank end of said rod extending out from said U shaped frame, flanges fixed on said rod on each side of said transverse portion of said U shaped frame whereby on the turning of the said crank the said bed block will be moved along the said beams of said frame, adjustable means for rocking said U shaped frame to vary its angularity with the said base block, said adjustable means being composed of a channel member aligned along and fixed to said base block, a vertical bolt having its head portion located in said channel and adapted to slide along on the channel but not to revolve therein, said bolt extending upwardly and through a transverse channel beam in the said bed block, a screw threaded sleeve nut on the said bolt whereby the angularity of said U shaped frame may be adjusted with the said base block.

3. In a belt adjuster of the class described, a base block, a channel member located along the top of said base block and fixed thereto, a U shaped frame mounted over the said channel and base block and with its beam ends located parallel with the said channel and these ends hinged to one end of said base block, a bed block mounted on said U shaped frame, a vertical bolt mounted with its head inside said channel and adapted to slide lengthwise therein, said bolt extending upwardly and with its upper end mounted through the said bed block, a spring mounted over the top of said bolt, a nut connected to the top of said bolt and adapted to clamp the said bed block and U shaped frame in a direction toward the said base block, a power unit mounted on said bed block transversely of said U shaped frame and said channel.

EDDIE CRAIG JARRETT.